No. 843,265. PATENTED FEB. 5, 1907.
F. B. FISCHER.
SCREW GAGE AND THE LIKE.
APPLICATION FILED OCT. 16, 1903.

2 SHEETS—SHEET 1.

Witnesses
Thomas Durant
Elizabeth Prippitt

Inventor:
Friederich B. Fischer
by Church & Church
his Attys

No. 843,265.

PATENTED FEB. 5, 1907.

F. B. FISCHER.

SCREW GAGE AND THE LIKE.

APPLICATION FILED OCT. 16, 1903.

2 SHEETS—SHEET 2.

Witnesses
Edwin L. Jewell
Thomas Durant

Inventor
Friederich B. Fischer,
By Church & Church
his Attorneys

UNITED STATES PATENT OFFICE.

FRIEDRICH BERNHARD FISCHER, OF DRESDEN, GERMANY.

SCREW-GAGE AND THE LIKE.

No. 843,265.　　　Specification of Letters Patent.　　　Patented Feb. 5, 1907.

Application filed October 16, 1903. Serial No. 177,318.

*To all whom it may concern:*

Be it known that I, FRIEDRICH BERNHARD FISCHER, a subject of the King of Saxony, and a resident of Dresden-A., in the Kingdom of Saxony, Germany, have invented certain new and useful Improvements in Screw-Thread-Testing Devices; and I do hereby declare the following to be a full, clear, and exact description of the same, reference being had to the accompanying drawings, forming a part of this specification, and to the figures and letters of reference marked thereon.

The object of this invention is to provide a simple, reliable, and accurate gage for testing the maximum and minimum diameters of screws, as well as the form of the teeth, by the simple application of the testing device thereto.

The invention consists in a testing device embodying, first, parallel flat jaws for determining the least permissible maximum diameter or the least diameter permissible at the apex of the thread, and, secondly, parallel jaws, one or both of which have teeth thereon at an angle corresponding to the pitch of the thread of the screw to be tested, the form of said teeth corresponding to the form of the spaces between the thread of the screw, their apices forming, with the opposite jaw, the gage for the greatest minimum diameter or greatest permissible diameter of the screw at the base of the thread and the bottom of the spaces between the teeth and the opposite jaw forming a gage for the greatest maximum diameter of the screw or greatest permissible diameter at the apex of the thread.

The invention further consists in a testing device formed by two bars connected in substantial parallelism with two pairs of parallel gage jaws or faces forming gages one for determining the least permissible maximum diameter and the other having teeth at an angle therein for determining the greatest permissible maximum diameter, the greatest permissible minimum diameter, and the form of the thread.

The invention further consists in certain novel details of construction and combinations and arrangements of parts, all as will be now described, and pointed out particularly in the appended claims.

Figure 1:
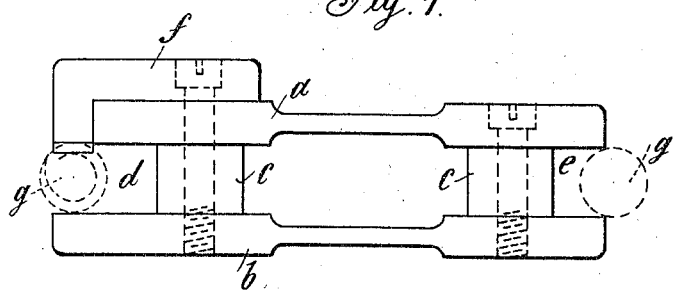
Figure 2:
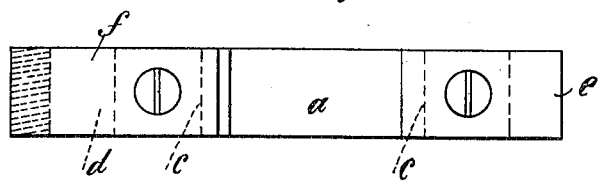
Figure 3:
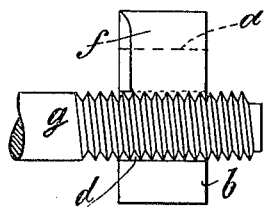
Figure 4:
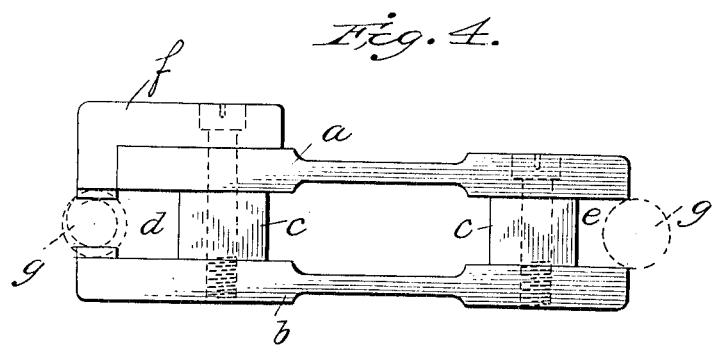

Referring to the accompanying drawings, Figure 1 is a side elevation of a testing device embodying the present invention. Fig. 2 is a plan of the same. Fig. 3 is an end elevation. Fig. 4 is a side elevation showing both jaws of one pair provided with teeth.

Like letters of reference in the several figures indicate same parts.

The bars $a$ and $b$, the parallel ends of which form the gage-jaws $d$ and $e$, are spaced and held by intermediate pieces or spacers $c$ and suitable connecting screws or pins of ordinary character. The proximate faces of the gage-jaws are parallel, and the space between them is accurately determined by the spacers; but in order that the body portions of one or both of the bars may be flexible to a degree such body portion between the spacers is preferably reduced somewhat in thickness. With this construction it is practicable to finish the bars uniformly, and in setting or assembling the parts one of the spacers may be of slightly less thickness than the other, and the ends of the bars when seated thereon may still maintain their parallelism, but with the gage-opening at that end of slightly less width than that at the other end for a purpose which will presently appear.

The proximate faces of the jaws of the gage-opening $c$ are plain and smooth, and they are accurately spaced to just prevent the entry of a screw of the proper maximum diameter, a screw which will enter being less than the permissible maximum diameter.

The faces of the jaws at the gage-opening $d$, while they are of the same general surface formation as those at $c$, have in addition teeth formed on a portion thereof conforming to the contour of the spaces in the thread of a screw of proper form and at an angle with relation to the jaws corresponding to the pitch of the screw-thread.

In the construction shown in Figs. 1, 2, 3 one jaw only is provided with teeth, while in Fig. 4 both jaws have teeth thereon. The teeth may, as shown, be formed on a separate or separable angle-piece $f$ for greater convenience in manufacture and to enable the toothed portion to be exchanged in case it becomes worn.

The gage-opening at the end having the teeth is made of such dimensions as to permit the entry of a screw having the proper maximum diameter, proper minimum diameter, and proper form of thread. If the maximum diameter or apex of the thread be too large, entry is prevented by contact with the bottoms of the spaces between the teeth on the jaw, even though the screw be of proper minimum diameter and the form of the thread correct. If the minimum diameter be too great, the apices of the teeth will prevent the entry of the screw, even though the maximum diameter be correct. The accuracy in the form of the thread may be determined in a comparison with the teeth by an examination in end elevation, as shown in Fig. 3, and obviously if the pitch of the thread be wrong the screw will not enter properly.

As an example of the use of the instrument the screw is first presented squarely to the gage end $e$. If it enters, it is at once rejected as smaller than the least permissible maximum diameter. If it does not enter, it is then presented squarely to the gage end $d$, and if it enters squarely and an examination from end elevation shows the form of the teeth to be correct it is passed as correct. Any imperfection due either to too great maximum or minimum diameter will prevent its entry, and it will be rejected.

It will be noted that the teeth extend only a limited distance in from the end of the jaw, and thus screws may be passed through until they are free from the teeth and withdrawn endwise from between the jaws, or the reverse order may be followed, thereby facilitating the operation of gaging.

What I claim is—

1. A screw-testing device having two parallel bars with testing-jaws at one end, one of which jaws has a series of teeth on its inner face corresponding in form to the spaces between the thread of the screw and extending at an angle corresponding to the pitch of said thread.

2. A screw-testing device having two substantially parallel flat bars with testing-jaws formed by their proximate faces at opposite ends and spacers rigidly connecting said bars intermediate the testing-jaws.

3. A screw-testing-device having two substantially parallel bars with testing-jaws formed by their proximate faces at opposite ends, one of said bars being reduced in thickness intermediate the ends whereby it is rendered flexible to permit of a reduction in width of one gage-opening between the bars and spacers connecting the bars intermediate the ends and outside of said flexible portion.

4. A screw-thread-testing device embodying two substantially parallel bars, spacers between said bars and beyond which the ends of the bars project in parallelism to form two gage-openings, one of said ends having a series of teeth on its inner face.

5. A screw-thread-testing device embodying two substantially parallel bars, spacers between said bars and beyond which the ends of the bars project in parallelism to form two gage-openings, one of said ends having a series of short teeth on its inner face remote from the spacer whereby a screw may be passed through said teeth and withdrawn endwise from between the bars.

6. A screw-testing device embodying substantially parallel bars, spacers between said bars and beyond which the ends of the bars project to form gage-jaws and a detachable jaw secured to one of said bars and having teeth on its inwardly-facing portion; substantially as described.

In testimony whereof I have signed my name to this specification in the presence of two subscribing witnesses.

FRIEDRICH BERNHARD FISCHER.

Witnesses:
  OTTO WOLFF,
  C. J. HUGO BRÜNING.